United States Patent

[11] 3,572,730

[72] Inventors Dennis L. Otto;
  Peter C. Paterson, Canton, Ohio
[21] Appl. No. 833,022
[22] Filed June 13, 1969
[45] Patented Mar. 30, 1971
[73] Assignee The Timken Company

[54] WEAR SURFACE FOR FACILITATING LUBRICATION OF ELEMENTS IN ENGAGEMENT THEREWITH
19 Claims, 11 Drawing Figs.

[52] U.S. Cl. ..................................................... 277/96,
  277/134
[51] Int. Cl. ....................................................... F16j 15/32
[50] Field of Search ............................................ 277/96,
  133, 134, 152, 153

[56] References Cited
UNITED STATES PATENTS
3,497,225  2/1970  Workman ..................... 277/134

*Primary Examiner*—Laverne D. Geiger
*Assistant Examiner*—Robert I Smith
*Attorney*—Gravely, Lieder & Woodruff ABSTRACT: A wear surface composed of a multiplicity of closely spaced triangular asperities is engaged by an element which moves relative thereto. The triangular shape of the asperities enables them to pump a lubricant contained in the depressions between the asperities in a direction transverse to the direction of relative movement. The asperities may be provided with curved leading corners to force a portion of the lubricant across the lands of the asperities and thereby furnish additional lubrication to the element as it passes over those lands. The asperities may be arranged in overlapping rows so as to insure adequate support of the element. The wear surface may be utilized in thrust applications such as on the thrust rib located at the large end of the frustoconical race on a tapered roller bearing.

PATENTED MAR 30 1971

INVENTORS
DENNIS L. OTTO
PETER C. PATERSON
BY *Gravely, Lieder & Woodruff*
ATTORNEYS

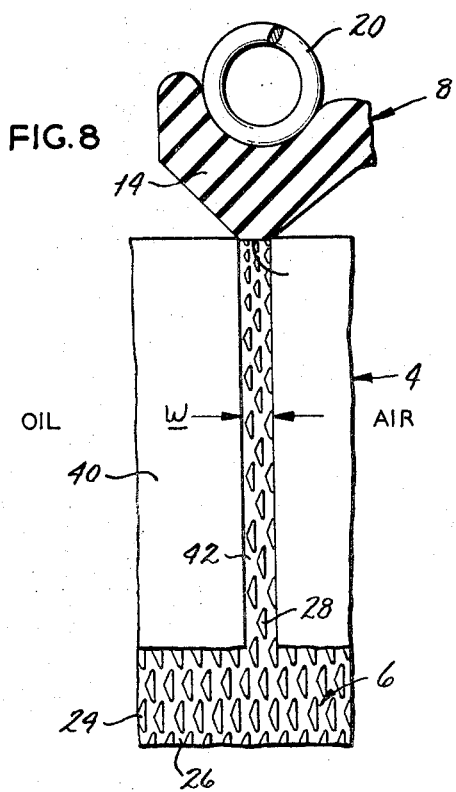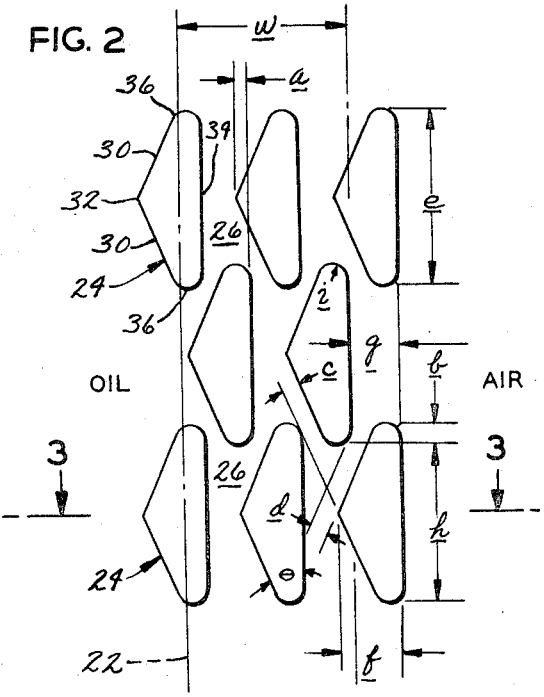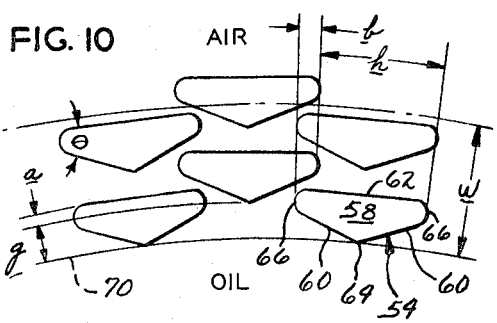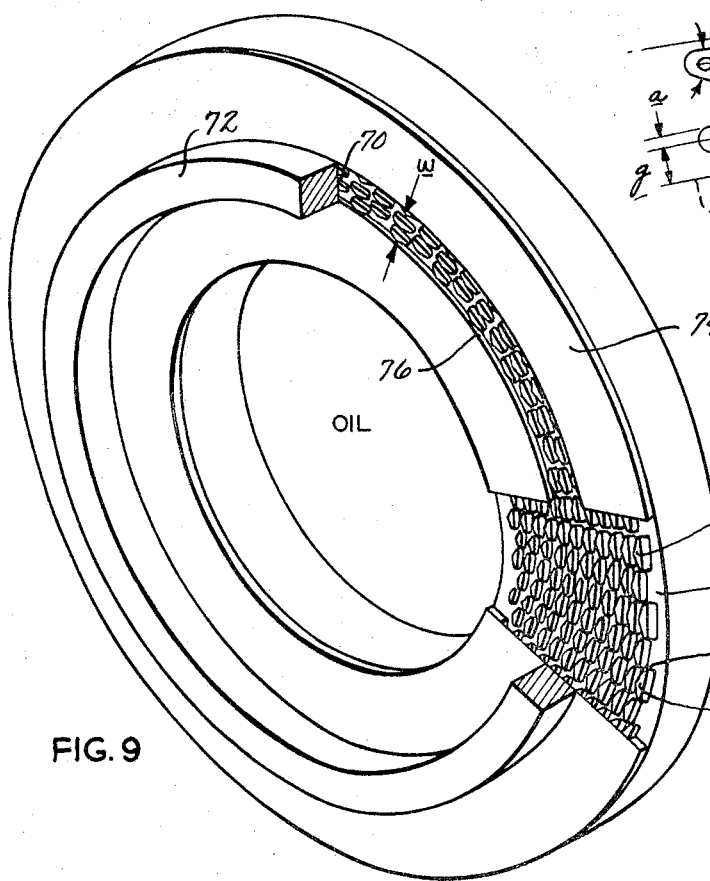

INVENTORS
DENNIS L. OTTO
PETER C. PATERSON
BY Gravely, Lieder & Woodruff
ATTORNEYS

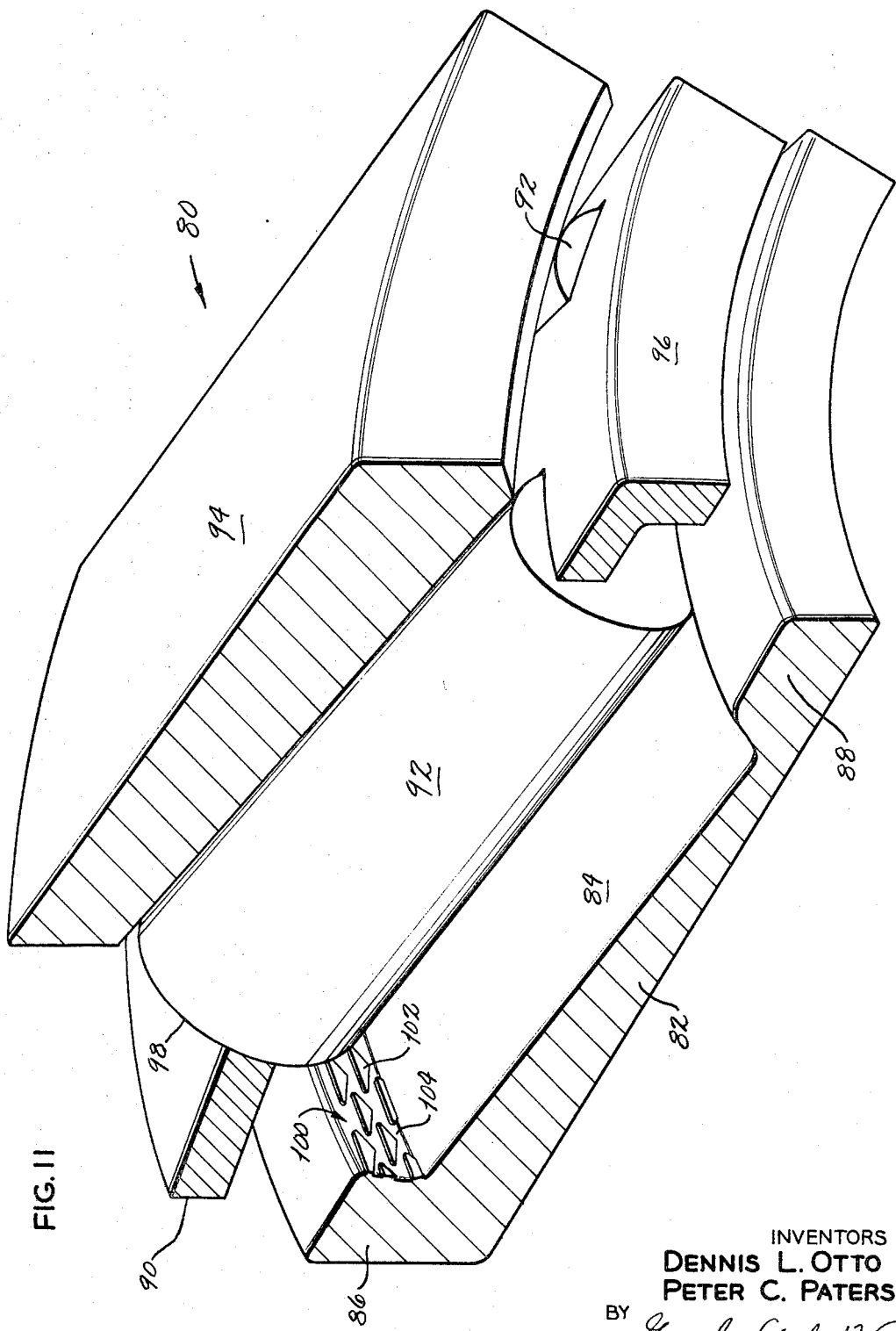

WEAR SURFACE FOR FACILITATING LUBRICATION OF ELEMENTS IN ENGAGEMENT THEREWITH

BACKGROUND OF THE INVENTION

This invention relates in general to wear surfaces and more particularly to wear surfaces which afford adequate lubrication of movable elements in engagement therewith.

Broadly speaking, conventional seal constructions consist of some sort of seal element, usually of an elastomeric composition, and a wear or working surface against which the seal element bears. Heretofore, it has been considered important to have the wear surface smooth to prevent the leakage of lubricant past the seal element and to further reduce friction at the area of contact. While smooth wear surfaces satisfactorily restrict lubricant seepage, at least at the outset, friction is not reduced since lubricant flow cannot be maintained at the areas of the wear surface engaged by the seal element. As a result, the seal element heats excessively, and in the case of elastomeric seals they become hard and brittle and ineffective for sealing purposes. Thus, in the long run, a smooth wear surface is actually detrimental to the maintenance of an adequate fluid barrier where elastomeric seal elements are involved.

Attempts have been made to overcome these problems by introducing lubricant grooves or channels in such wear surfaces at their areas of contact with the seal elements, but those attempts have to a large measure been unsuccessful. In particular, the grooves have contributed to abrading and guttering of the seal elements associated with them and have further permitted lubricant to escape past the seals in quantities far above amounts considered acceptable for lubricant seals.

Lubricant starvation is not restricted to seal constructions, but is also present generally wherever two contacting surfaces move relative to one another. For example, in tapered roller bearings the circular ends of the rollers bear against a thrust rib as they revolve about their own axes and move circumferentially around the cone on which the rib is located. Unless the wear surface on such a rib receives adequate lubrication, the bearing will heat excessively.

SUMMARY OF THE INVENTION

One of the principal objects of the present invention is to provide a wear surface which permits the distribution of lubricant throughout the area on it which is engaged by a mating element movable relative thereto. Another object is to provide a surface of the type stated which continually supplies a lubricant to the area of contact with the element. An additional object is to provide a wear surface which prolongs the life of mating elastomeric seal elements. A further object is to provide a wear surface which adequately supports mating surfaces so as to avoid guttering and abrading of the mating surface. Yet another object is to provide thrust and other bearing surfaces capable of carrying high loads. Still another object is to provide an improved tapered bearing in which the end faces of the tapered rollers receive adequate lubrication. These and other objects and advantages will become apparent hereinafter.

The present invention resides in a wear surface composed of a multiplicity of closely spaced triangular asperities separated by an intervening surface of a different elevation. The invention encompasses the arrangement of the asperities in overlapping rows, as well as the formation of blunted leading edges on the asperities. The first feature enhances load support, while the last feature enables positive asperities to divert a lubricant out of adjoining depressions and across the asperities as a mating element moves across the asperities. The invention further includes the employment of asperate wear surfaces for thrust applications such as on the thrust rib of the cone of a tapered roller bearing. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 2 is a plan view of the wear surface showing the array formed by the asperities thereon;

FIG. 8 is a side elevational view, partially in section, of the seal construction illustrated in FIG. 7;

FIG. 9 is a perspective view, partially broken away and in section, of a parallel face seal construction having a wear surface constructed in accordance with and embodying the present invention;

FIG. 10 is a plan view of the wear surface in the seal construction of FIG. 9 and showing the array formed by the asperities thereon; and FIG. 11 is a fragmentary perspective view of a tapered roller bearing provided with a wear surface forming part of the present invention.

DETAILED DESCRIPTION

Figure 1:
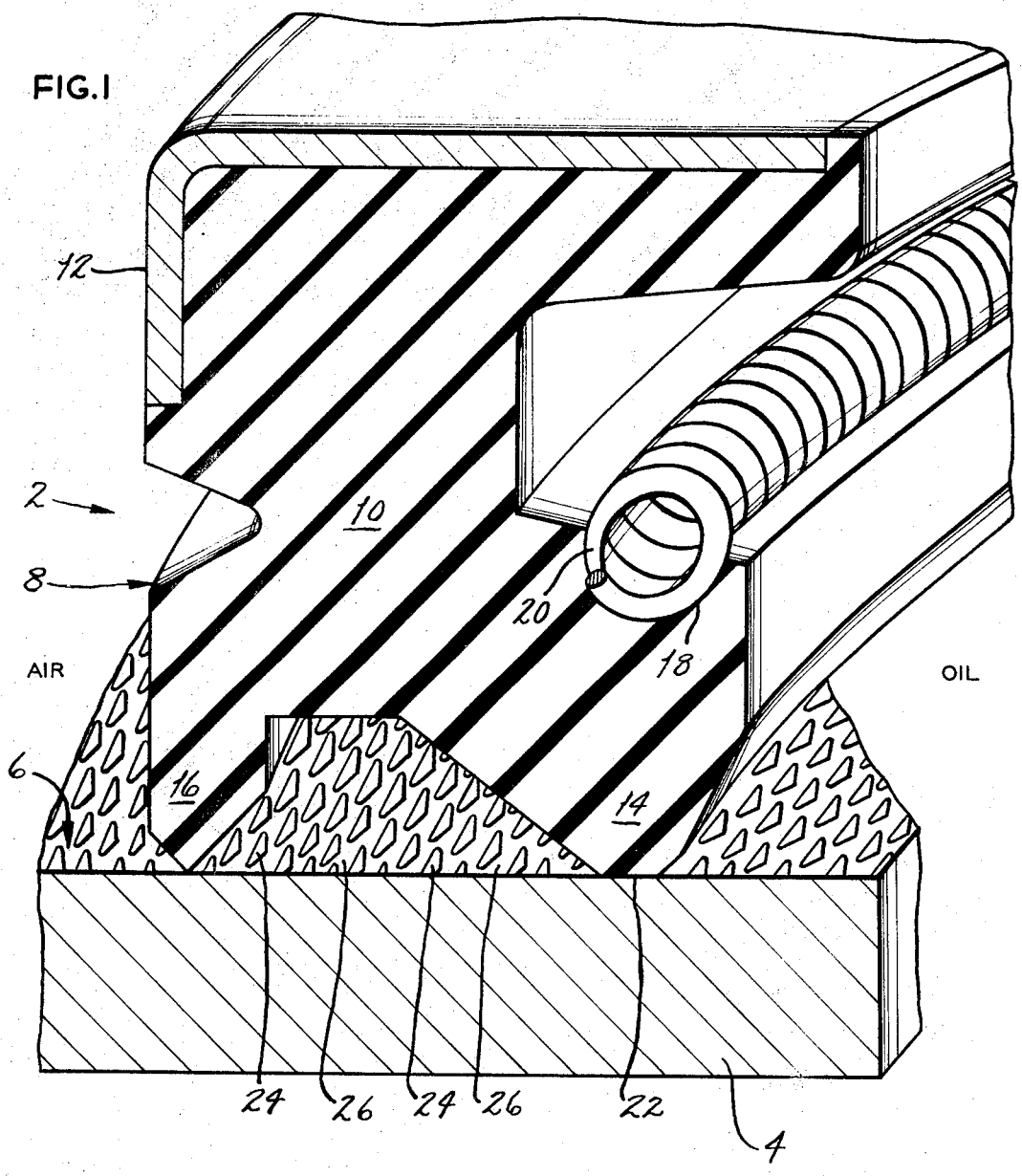
FIG. 1 is a fragmentary perspective view showing a circumferential lip seal construction provided with a wear surface constructed in accordance with and embodying the present invention.

Referring now in detail to the drawings, and in particular to FIGS. 1 and 8, 2 designates a seal construction of the circumferential lip variety including a rigid wear ring or segment 4 having a cylindrical wear or working surface 6 which is embraced by an elastomeric circumferential lip seal 8. The seal 8 and wear ring 4 are mounted on members which rotate relative to one another so that the ring 4 rotates relative to the lip seal 8. For example, the wear ring 4 may be press-fitted onto a rail car axle adjacent to the cones of a roller bearing, and the seal 8 could be attached to the cup of that bearing.

More specifically, the lip seal 8 includes a body portion 10 which along its outer periphery is bonded to a rigid seal case 12 for mounting purposes. Inwardly therefrom the body portion 10 merges into a pair of lips 14 and 16 which engage the wear surface 6. The lip 14 is somewhat wider than the lip 16 and forms a lubricant seal or barrier with the wear ring 4, whereas the lip 16 forms a dust seal with the wear ring 4. Thus, the oil side of the seal construction 2 is to the right of the lip 14, reference being made to FIG. 1. The body portion 10 of the lip seal 8 is further provided with an outwardly opening circumferential groove 18 into which a garter spring 20 is fitted for urging the lip 14 snugly against the wear ring 4. The lip 14 engages the wear surface 6 along a generally cylindrical seal face 22 of axial width w.

Figure 3:
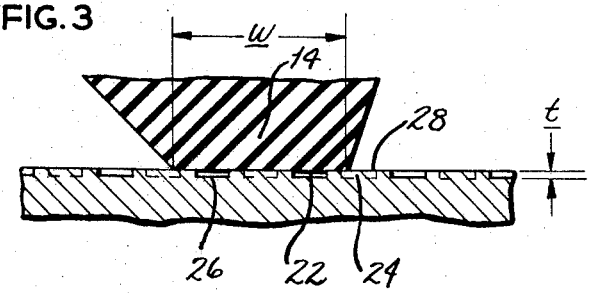
FIG. 3 is a sectional view taken along line 3-3 of FIG. 1.

The cylindrical wear surface 6 is actually composed of a multiplicity of generally triangular asperities 24 (FIGS. 1—3) which are separated from one another by depressions 26. In other words, the asperities 24 are separated by an intervening surface of a lower elevation. Each asperity 24 includes an outwardly presented land 28 and the lands 28 of all the asperities 24 create an interrupted surface area disposed outwardly from the depressed or intervening surface area created by the depressions 26. Each asperity 24 is peripherally defined by angularly related sidewalls 30 and a base wall 34 (FIG. 3). The sidewalls 30 intersect at an apex 32 and the base wall 34 merges into the opposite ends of the sidewalls 30 at blunted or arcuate corners 36. Accordingly, the shape of the land 28, as well as the asperity 24, approximates that of an isosceles triangle. Each triangular asperity 24 forming the array is oriented such that its apex 32 points toward the oil side of the seal construction 2 and its base wall 34 extends in the direction of relative rotation between the respective asperity 24 and the contacting seal face 22. Thus, each sidewall 30 is presented oblique to the direction of relative rotation, and as will be presently more fully explained this orientation of the sidewalls 30 permits them to serve as pump impellers.

The asperities 24 are of equal size and identical configuration and are arranged in circumferential and axial rows so as to form a predetermined pattern or array (FIG. 2). In this array the walls 34 of the asperities 24 in each circumferential row align so that the walls 34 form successive circles about the wear surface 6. Moreover, the apexes 32 in each circumferential row project axially beyond the base walls 34 of the preceding row and this overlap is termed axial overlap $a$. The apexes 32 of the asperities 24 in each axial row, on the other hand, align and form parallel lines along the wear surface 6, which lines are perpendicular to the circles defined by the base walls 34. The arcuate corners 36 on the asperities 24 in each axial row project beyond the arcuate corners 36 of the asperities 24 of the adjacent axial rows so that the depressions 26 between each axial row do not form a direct axial path across the wear surface 6. This is designated as circumferential overlap $b$. Moreover, the sidewalls 30 of adjacent asperities 24 in succeeding circumferential rows are not colinear, but are shifted such that the continuation of the sidewall 30 on an axially trailing row will be presented ahead of the sidewall 30 on the adjacent asperity 24 in the preceding circumferential row. This is termed the array shift $c$ between adjacent rows and makes axial overlap $a$ possible. The minimum clearance between adjacent circumferential rows is designated by the dimension $d$, and it occurs in the vicinity of the corners 36 of the asperities 24 on those adjacent rows. Other dimensions of interest which further serve to define the array formed by the asperities 24 are the circumferential asperity size $e$, the axial asperity size $f$, the axial increment $g$ between adjacent rows, the circumferential increment $h$ between adjacent axial rows, the asperity radius $i$ at the corners 36, and the asperity angle $\Theta$ between the sidewalls 30 and the base walls 34.

The circumferential asperity size $e$ and the axial asperity size $f$ are not critical but excellent results have been obtained when the smallest of the two dimensions is between 0.005 and 0.040 inches. Normally, this will be the axial asperity size $f$ since it is desirable, although not necessary, to keep the asperity angle $\Theta$ relatively small. Indeed, an asperity angle $\Theta$ of approximately 20° has proved suitable for most applications. The lands 28 should occupy ⅓ to ⅔ of the total area on the wear surface 6 across which the asperities 24 extend. The depth of the asperities 24, that is the distance $t$ between the lands 28 and the troughs of the depressions 26 (FIG. 3), should be between 10 and 100 microinches (0.000010 to 0.000100 inches). The width $w$ of the seal face 22 should be such that the seal face 22 extends axially across at least three circumferential rows of asperities 24. In actual practice, considerably more than three rows of asperities 24 should be provided on the working surface 6 to compensate for misalignment and flexure of the lip seal 8.

A particularly effective method for obtaining the desired asperate wear surface 6 on the wear ring 4 is to first mask a finished surface so as to provide the desired asperities 24 in relief and then chemically etch the exposed portions of the surface. The finished surface may be provided on unetched wear ring 4 by a through grinding operation which is considerably more economical than plunge grinding. The grooves resulting from this grinding, however, should not exceed the depth of the subsequent etch which is, of course, the depth $t$ of the asperities 24. The masking may be accomplished in a wide variety of ways including lithographic or photographic techniques wherein a masked pattern is photographically reproduced on the wear ring 4, electrodeposition or electrostatic coating of a desired pattern, the use of decals, or practically any means of providing a pattern, coat, or print that will at least temporarily inhibit chemical etching in preselected areas to reproduce the desired etched pattern. Any chemical etchant capable of removing metal from the wear ring 4, whether acidic or basic in nature, may be employed. A solution consisting of five parts nitric acid and 95 parts water maintained at a temperature of 70°—75° has proved particularly successful.

When the lip seal 8 and wear surface 6 are at rest, the flexible seal face 22 will tend to sink into the depressions 26. The distortion, however, is minimal due to the close spacing between the asperities 24. Leakage through the depressions 26 under static conditions is avoided by reason of the fact that the depth of the depressions 26 does not exceed the thickness of the fluid or lubricant film. That thickness is normally about 100 microinches. In other words, the depressions 26 are extremely shallow in their own right, and thereby inherently impede the passage of lubricant through them due to the effects of surface tension. This enables the seal construction 2 to serve as a very effective static barrier or seal.

However, when the seal 8 rotates relative to the wear ring 4, the seal face 22 is lifted substantially to the height of the cylinder defined by the lands 28 and the effects of surface tension are destroyed. Consequently, the lubricant works into the depressions 26 between the asperities 24 and fills the voids so defined. The lubricant within the depressions 26 contacts the seal face 22 so that any given segment of the seal face 22 is supplied with a thin lubricant film as it traverses an adjacent land 28. Moreover, the leading arcuate corner 36 of each asperity 24 tends to force some of the lubricant up out of the adjacent depression 26 and over the land 28 where it lubricates the interface between the land 28 and the seal face 22. Thus, the seal face 22 receives a continuous supply of lubrication which prevents the seal 8 from overheating, and this in turn avoids hardening of the seal 8 and the loss of flexibility which accompanies that hardening. Accordingly, the seal 8 remains flexible throughout long periods of operation.

The asperities 24, furthermore, break up grinding and machining patterns and thereby eliminate the tendency of such patterns to pump the lubricant across the seal face 22 toward the air side of the seal construction 2.

Inasmuch as the sidewalls 30 of each asperity 24 are oblique to the circumferential path traversed by the asperity 24, the lubricant will be deflected away from the asperity 24 in the general direction to which the apex 32 points by the leading sidewall 30 on each asperity 24. In other words, the leading sidewalls 30 serve as pump impellers and move the lubricant toward its source or reservoir which is at the lubricant side of the seal construction 2. The asperity angle $\Theta$ regulates this pumping action and its magnitude is dictated by the viscosity of the lubricant and the operating speed, among other considerations. An asperity angle $\Theta$ in the neighborhood of 20° has been found suitable for most applications. The trailing sidewall 30 has no effect on the lubricant until the direction of rotation is reversed, in which case it becomes the leading sidewall 30 and performs the pumping action. Since the base wall 34 is parallel to the circumferential path described by its asperity 24, it provides no pumping action whatsoever irrespective of the direction of rotation and, therefore, does not force the lubricant toward the air side of the bearing 2. By reason of the pumping action, the effectiveness of the lubricant barrier formed on the seal 20 at the engagement of the lip 14 and the wear surface 6 is enhanced. While the leading arcuate corner 36 of each asperity 24 does detract slightly from the pumping effect which could otherwise be achieved if the leading sidewall 30 intersected the base wall 34 at the acute angle $\Theta$, the leading arcuate corner 36 does force some of the lubricant out of the adjacent depression 26 and across the land 28, as has been previously noted. This enables the asperities 24 to support a greater seal load.

Both the circumferential overlap $a$ and the axial overlap $b$ permit the formation of a greater number of asperities 24 on the wear surface 6, and this increases the area occupied by the lands 28 which support the seal face 22 while still maintaining adequate spacing between adjacent asperities 24. In other words, the hydrodynamic load support is increased when either circumferential overlap $a$ or axial overlap $b$ or both are introduced into the array. The circumferential overlap $a$, furthermore, breaks up direct circumferential paths about the wear surface 6, and this prevents guttering or grooving of the seal face 22 in operation. The axial overlap $b$ on the other hand, breaks up direct axial paths across the wear surface 6, and thereby presents more obstructions to the passage of lubricants across the wear surface 6. This, in turn, reduces seepage.

Figure 4:
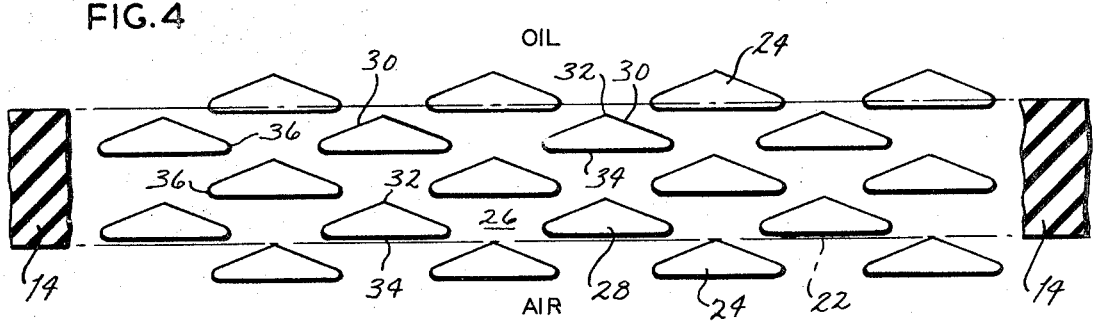
FIG. 4 is a plan view of the wear surface with the asperities in a modified array.

Turning now to FIG. 4, the asperities 24 may also be arranged in a simple geometric array, in which case the base walls 34 of the asperities 24 in each row align so as to form a circle about the wear surface 6 and, of course, the aligned base walls 34 in successive rows form successive circles. The sidewalls 30 of the asperities 24 in adjacent circumferential rows, instead of being shifted by the dimension $c$, align with each other in the formation of crossed helixes across the wear surface 6. By reason of this fact, the axial overlap $a$ is reduced to zero or to a negative quantity. While hydrodynamic load support is not as great, adequate lubrication is imparted to the seal face 22. The arcuate corners 36 and angularly related sidewalls 30 serve the same purpose as in the array illustrated in FIG. 2, that is, the former diverts a portion of the lubricant out of the depressions 26 and onto the lands 28, whereas the latter pump the lubricant toward the lubricant side of the seal construction 2.

Figure 5:
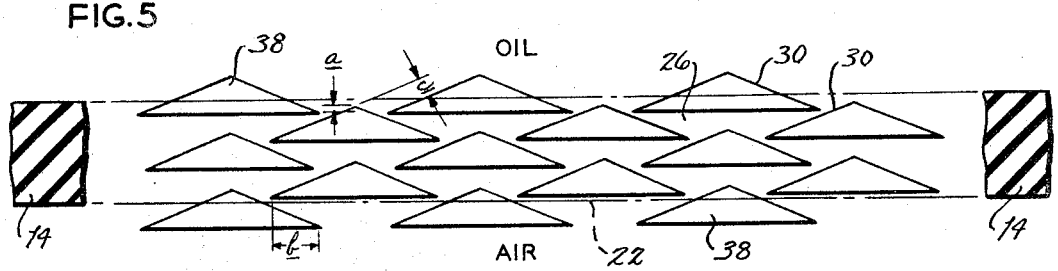
FIG. 5 is a plan view of a wear surface provided with modified asperities but having the asperities arranged in an array similar to the array of FIG. 3.

Referring now to FIG. 5, the array may be composed of asperities 38 which are in every respect identical to the asperities 24 except that they are true triangles, that is, they are not provided with arcuate corners 36. The asperities 38 are, furthermore, arranged in an array of circumferential and axial rows with axial overlap $a$, circumferential overlap $b$, and array shift $c$, as well as other parameters characteristic of the array illustrated in FIGS. 1—3. The axial and circumferential overlap $a$ and $b$ of the array formed by the asperities 38 serve the same purpose as does the overlap $a$ and $b$ in the array of asperities 24. The absence of arcuate corners on the asperities 38 creates longer sidewalls 30 and enables them to pump more lubricant in comparison to the asperities 24.

Figure 6:
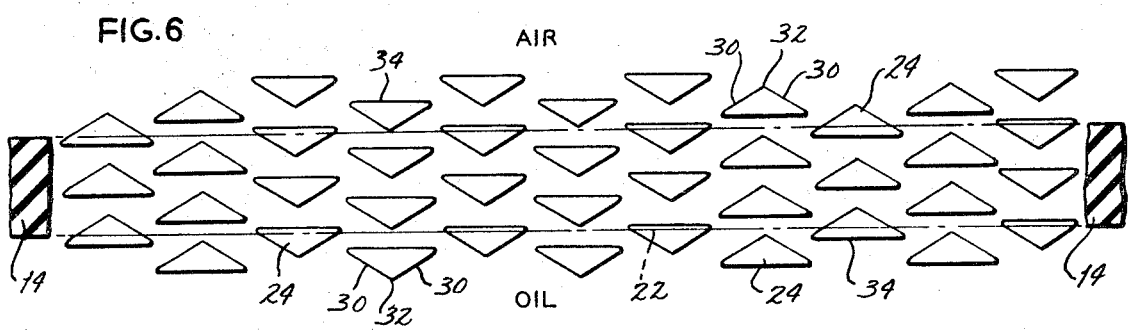
FIG. 6 is a plan view of the wear surface with the asperities arranged in another modified array.

The effectiveness of the asperities 24 insofar as the pumping action is concerned is dependent on many factors such as the asperity angle $\Theta$, the length of the sidewalls 30, the width of the depressions 26 between adjacent asperities 24, the operating speed, the lubricant viscosity, the operating temperature, the sealing force at the seal face 22, and the thickness of the lubricant film. In some instances, these conditions are all such that the pumping action is too effective and the outermost asperities 24 of the array and the portion of the seal face 22 which traverses those asperities do not receive adequate lubrication. As will be seen by reference to FIG. 6, this lubricant starvation can be overcome by orienting a portion of the asperities 24 in the opposite direction, that is, with their apexes 32 pointing axially outwardly toward the air side of the seal construction 2 instead of inwardly toward the lubricant so that they will pump in the opposite direction. This arrangement of the asperities 24 restores lubricant circulation throughout the entire asperity array traversed by the seal face 22 so that the seal face 22 is constantly lubricated across its entire width. Arranging the oppositely oriented asperities 24 in circumferentially extending sections interposed between circumferentially extending sections of inwardly oriented asperities 24, as illustrated in FIG. 6, forms a highly satisfactory lubricant seal and proved to be superior to intersper012_024 individual oppositely oriented asperities 24 among the inwardly directed asperities 24. An array having 30 percent of the asperities pointing outwardly toward the air side of the seal construction 2 and the remainder pointing inwardly toward the lubricant side appeared to be the most suitable array for railway applications. This pattern provided adequate lubrication to the seal face 22 by permitting circulation of the lubricant back into the asperity array, yet still eliminated leakage problems.

In a like manner, a portion of the asperities 38 (FIG. 5) may be reversed to provide the same advantages.

While hydrodynamic lubrication is excellent when the depth $t$ of the asperities 24 is between 10 to 100 microinches, these dimensions cannot be maintained over extended periods of time where relatively high seal loads are employed, such as those generated by strong garter springs 20, since the wiping action of the lip seal 8 across the wear ring 4 in time wears the asperities 24 until they are substantially obliterated and no longer effective. Of course, deeper asperities 24 on the order of 500 microinches in depth can be used from the outset, but until such asperities 24 wear down to approximately 100 microinches, excessive amounts of lubricant will leak through the depressions 26. With lighter seal loads this wear problem is not nearly so pronounced.

Figure 7:
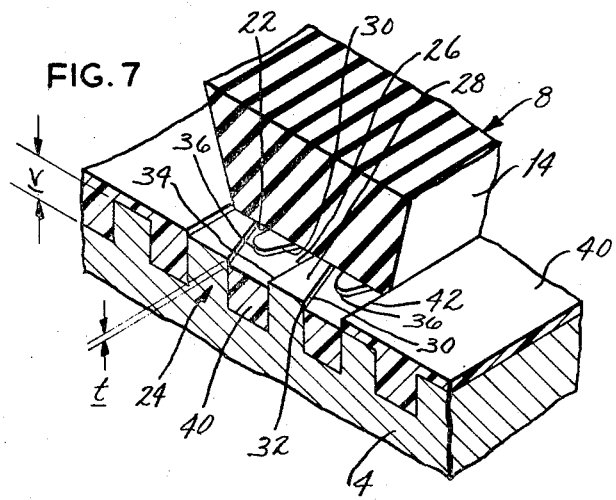
FIG. 7 is a fragmentary perspective view of a seal construction similar to FIG. 1, but showing the working surface coated with a filler material.

As illustrated in FIGS. 7 and 8, this problem is overcome by utilizing a deep etched pattern in which the asperities 24 have a true depth $v$ of up to 500 microinches. The depressions 26 are subsequently filled with and the lands 28 covered by a thin coating 40 which is less resistant to wear than the material from which the wear ring 4 is formed. Plastic filler materials are suitable for this purpose, and of all the plastic filler tested, polyurethane containing 20 percent by weight of microfine molybdenum disulfide appeared to give the best results. This material was sprayed onto the surface 6 of the asperity etched wear rings 4.

When the wear ring 4 provided with a coating 40 of the filler material is placed in operation, the lip 16 will, during a relatively short run-in period, cut a wear path 42 (FIG. 8) through the coating 40, and that path 42 will be substantially equal in width to the width $w$ of the seal face 22. When the lands 28 of the asperities 24 are exposed, the coating 40 will continue to wear in the areas intermediate the asperities 24, that is at the depressions 26, until a differential of between 25 and 100 microinches is established between the exposed coating surface in the depressions 26 and the lands 28. The exact depth of this differential is the effective depth $t$ of the asperities 24, and it is dependent on many conditions such as the flexibility of the lip seal 8, the radial seal force imparted by the garter spring 20, the constituency of the lubricant, and the peripheral velocity of the ring 4. As the asperities 24 wear through continued operation, so does the coating 40 in the depressions 26 between the asperities 24, and this wear is such that the same differential or effective asperity depth $t$ is maintained. Thus, an optimum effective depth $t$ is maintained while the seal 20 wears through the entire 500 microinches of asperities 24, and this requires considerable time. The optimum effective depth $t$ decreases rapidly as wear occurs beyond the point of obliteration of the filler material coating 40. The asperity effectiveness is reduced as the pattern becomes less well defined and as the effective depth $t$ decreases during the propagation of the pattern through the base material of the wear portion 4 until the pattern of asperities 24 is eventually completely obliterated. Thus, after the coating 40 has worn away, the asperities 24 are self-generating to a limited extent.

The coating 40 may also be applied over the asperities 38 (FIG. 5) with the same results.

Referring now to FIGS. 9 and 10, aside from the circumferential lip seal construction 2, the foregoing principles may, in addition, be employed in a seal construction 50 of the parallel face variety. Like the seal construction 2, the seal construction 50 includes a wear surface 52 composed of a multiplicity of asperities 54 separated by depressions 56. The asperities 54, furthermore, outwardly terminate at lands 58 and at their sides are defined by sidewalls 60 and base walls 62. The sidewalls 62 of each asperity 54 intersect at an apex 64 and at their opposite ends merge into the base wall 62 at arcuate corners 66. The lands 58, unlike the lands 28, do not form segments of a large cylinder, but, on the contrary, are coplanar and perpendicular to the axis of rotation. The wear surface 52 is engaged across the lands 58 of its asperities 52 by a seal face 70 forming part of an annular elastomeric face seal 72, and the seal face 70 is similarly planar and perpendicular to the axis of rotation instead of cylindrical. The asperities 54 are, moreover, arranged in successive radially spaced rows with radial overlap $a$ instead of successive axially spaced rows with axial overlap $a$. The asperities 54 also form radial rows with circumferential overlap $b$ instead of axial rows with circumferential overlap $b$. In addition, each asperity 54 has a circumferential size $e$, a radial size $f$, and an asperity angle $\Theta$. However, by reason of the arrangement in radially spaced rows, one distinction is readily apparent, and that is the diminishing size of the asperities 54 in each successive row from the outermost to the innermost row. In other words, the circumferential and radial sizes $e$ and $f$ of the asperities 54 closest to the axis of rotation are smaller than the circumferential and radial sizes $e$ and $f$ of the asperities 54 furthest from the axis of rotation. In this connection, the base walls of the asperities 54 are arcuate, and thereby form concentric circles about the wear surface 52, but since the circumferential length of each asperity 54 is indeed small compared to the circumference of the seal face 70 they appear linear.

Like the array of asperities 24 of the circumferential seal construction 2, the array of asperities 54 of the parallel face seal construction 50 may also be defined by the axial increment $g$ between adjacent circumferential rows, the circumferential increment $h$ between adjacent radial rows, and the asperity radius $i$. Similarly, the same dimensional parameters are applicable to the seal construction 50. In particular, the effective depth $t$ of the asperities 54 should be between 10 and 100 microinches; the lands 58 should occupy between ⅓ and ⅔ of the total surface area across which the asperities 54 extend; the radial width $w$ of the seal face 70 should be such that it covers at least three circumferential rows of asperities 54; and the smallest plan dimension of each asperity 54, which dimension is normally the radial size $f$, should be between 0.005 and 0.040 inches. While the radial size $f$ of the asperities 54 varies from one circumferential row to another, no difficulty is encountered keeping that dimension within the prescribed limits inasmuch as the seal face 70 covers only a few circumferential rows.

To prolong the useful life of the asperities 54, they may be formed in an extended length in the neighborhood of 500 microinches and subsequently covered with a coating 74 of a filler material (FIG. 9) which is similar to the coating 40 shown in FIG. 7. During the run-in period the face seal 72 will wear a path 76 through the coating 74 and engage the lands 58 of the asperities 54. This wear path 76 will have a radial dimension approximately the same as the width $w$ of the seal face 72. Thereafter, the coating 74 in the depressions 56 wears somewhat deeper than the lands 58, inasmuch as the coating 74 is softer than the asperities 54, so that the depressions 26 are, in effect, reestablished as voids between the asperities 54. The effective depth $t$ of the reestablished depressions 26 will remain between 25 to 100 microinches until the coating 74 is completely eliminated and the asperities 54 are obliterated.

The parallel face seal construction 50 operates very similar to the circumferential lip seal construction 2. More specifically, portions of the depressions 26 which are void of the coating 74 of filler material permit lubricant to contact the seal face 70 and lubricate it as it passes across the lands 58. The angularly related sidewalls 60 serve as pump impellers for directing the lubricant back to its source, while the arcuate corners 66 direct some of the lubricant out of the adjacent depressions 56 so as to provide additional lubrication at the lands 58. The radial and circumferential overlaps $a$ and $b$ enhance hydrodynamic load support, while the radial overlap $a$ further serves to prevent grooving or guttering of the seal face 72.

In the array illustrated in FIGS. 9 and 10, the lubricant reservoir is located toward the axis of rotation and, consequently, the apexes 64 of asperities 54 point in that direction. To pump in the opposite direction, the orientation of the asperities 54 need only be reversed, in which case the apexes 64 would point radially outwardly instead of inwardly. Similarly, the asperities 54 may be arranged in a simple geometric array, in which case the sidewalls 60 of adjacent asperities 54 in successive circumferential rows would align and there would be a zero or a negative radial overlap $a$. Also, the asperities 54 may be formed without the arcuate corners 66 and would, accordingly, appear somewhat similar to the asperities 38 illustrated in FIG. 5. In addition, the orientation of only a portion of the asperities 54 may be reversed to provide full lubricant distribution under the seal face 70, and in that case the array would appear somewhat similar to the array illustrated in FIG. 6.

While the load imposed on the wear surface 52 by the parallel face seal 72 is in a sense a thrust load, a separate surface formed in accordance with the present invention may be used where thrust loads of a much larger magnitude are encountered. As will be seen by reference to FIG. 11, asperate surfaces are ideally suited for receiving thrust loads in bearing constructions. More specifically, a tapered roller bearing 80 includes cone 82 having a frustoconical race 84 which is bounded at each end by circumferential ribs 86 and 88 formed integral with the cone 82. The cone 82 is encircled by a cage 90 having a plurality of tapered rollers 92 captured in it at equal circumferentially spaced intervals. The rollers 92 fit into the groove formed by the ribs 86 and 88 and roll along the race 84. The cage 90 is, in turn, circumscribed by a cup 94 having an inwardly presented race 96 which is also engaged by the rollers 92. The foregoing construction is, of course, conventional and permits elimination of free play between the cone 82 and the cup 94 merely by adjusting the axial disposition of those components. This, in turn, involves applying opposite axially directed forces to the cone 82 and cup 94. These axial forces are transferred through the rollers 92, as are the radial loads carried by the bearing 80.

The ribs 86 and 88 confine the rollers 92 axially, while the larger rib 86 further provides an abutment for correctly positioning the rollers 92 between the cone 82 and the cup 94. In particular, the circular end faces 98 of the rollers 92 bear against a wear surface 100 formed on the thrust rib 86 adjacent to the larger end of the race 84. This wear surface 100 is composed of a plurality of generally triangular asperities 102 which are separated by depressions 104. The array formed by the asperities 102 is very similar to the array of asperities 54 illustrated in FIG. 9, and like that array the array of asperities 102 has both radial and circumferential overlap. Moreover, the apexes of the asperities 102 point radially inwardly toward the race 84.

As the rollers 92 revolve about their own axes as well as circumferentially around the inner race 84 by reason of relative rotation between the cone 82 and cup 94, the circular end faces 98 of the rollers bear against the wear surface 100. The asperities 102 serve as an abutment for positioning the moving rollers 92, while the depressions 104 permit the lubricant to flow inwardly across the entire wear surface 100. Thus, the lubricant within the depressions 102 contacts the end faces 98 and reduces the friction between the lands of the asperities 102 and the end faces 98. Since the apexes of the asperities 102 point inwardly, the lubricant is pumped toward the inner race 84 as the rollers 92 move circumferentially along the wear surface 100. Inasmuch as the asperities 102 function only to support the thrust load imparted by the end faces 98 of the rollers 92, the maximum depth of the asperities 102 is not critical and may exceed 100 microinches.

Asperities similar to the asperities 54 are equally as effective in other and more conventional thrust applications and, similarly, asperities similar to the asperities 24 may be used on radial bearing surfaces.

While the asperities 24, 38, 54 and 102 as illustrated and previously discussed herein are all of the positive variety, that is, they project outwardly from an intervening surface, they may also be of the negative variety, in which case they would form individual pockets or depressions in an intervening surface and the combined outwardly presented surfaces of these pockets would constitute an interrupted surface area. The pumping effect with negative triangular asperities is the reverse of that provided by the positive asperities 24, 38, 54 and 102 heretofore described, and, accordingly, negative asperities should be oriented with their apexes pointing in the opposite direction.

This invention is intended to cover all changes and modifications of the examples of the invention herein chosen for purposes of the disclosure which do not constitute departures from the spirit and scope of the invention.

We claim:

1. A wear surface for engaging a face of an element movable relative thereto in the presence of a lubricating medium; said surface comprising a multiplicity of generally triangular lands separated from one another by a substantially continuous depression, each land being peripherally defined by angularly related walls, at least two of the walls along each land merging at a blunted corner which forms the leading edge of the land as the wear surface and element move relative to each other, whereby the lubricating medium will flow through the depression and will be forced out of the depression and across the lands by the movement of the engaging face of the element across the blunted leading corners of the lands.

2. A wear surface according to claim 1 wherein the blunted corner is curved.

3. A wear surface according to claim 2 wherein the angularly related walls are angularly related sidewalls which intersect at an apex and are located oblique to the direction of relative movement, and a base wall which extends generally in the direction of relative movement; and wherein the curved corner joins the base wall and one of the sidewalls so as to form the leading edge of the land, whereby the leading sidewall will function as an impeller and pump the lubricant in the general direction in which the apex points.

4. A wear surface according to claim 2 wherein the triangular lands are arranged in rows which extend generally in the direction of relative movement; and wherein the apexes of one row project beyond the base walls extending along the lands in another row.

5. A wear surface according to claim 4 wherein both sidewalls extending along each land merge into the base wall also extending along that land at curved corners, wherein the lands are further arranged in rows which extend generally transverse of the direction of relative movement; and wherein the curved corners in each transverse row project beyond the curved corners in adjacent transverse rows.

6. A wear surface according to claim 4 wherein the shortest dimension of each land is between approximately 0.005 and 0.040 inches; wherein the effective depth of the side and base walls is between approximately 10 and 100 microinches; and wherein the element supported by the lands extends transversely of the direction of relative movement across at least three rows of lands.

7. A wear surface according to claim 4 wherein the apexes of a majority of the triangular lands point in one direction; and wherein the apexes of the remaining triangular lands point in the opposite direction, whereby at least one of the sidewalls along the reversely oriented lands will insure distribution of the lubricant across the face of the element which engages the lands.

8. A wear surface according to claim 2 wherein both of the sidewalls along each land merge into the base wall along that land at curved corners; wherein the lands are arranged in rows which extend generally in the direction of relative movement; and wherein the sidewalls along the triangular lands align with the sidewalls along adjacent triangular lands in adjacent circumferential rows so that the triangular lands form a simple geometric array.

9. A wear surface according to claim 3 which is cylindrical and rotates relative to the element about an axis of rotation which is coaxial with the axis of the cylindrical wear surface; and wherein the element engaging the wear surface is a radial lip seal of an elastomeric constituency.

10. A wear surface according to claim 3 wherein the wear surface is generally planar and rotates relative to the element about an axis of rotation perpendicular to the plane of the wear surface, and wherein the element engaging the wear surface is a parallel face seal of an elastomeric constituency.

11. A wear surface according to claim 1 and further characterized by a filler material in the depression, the filler material being less resistant to wear than the material forming the lands, whereby, during relative movement of the engaging element along the lands and filler material, the filler material between the lands will wear and to a limited extent reestablish the depression beneath the supported element so that lubricant can flow through the reestablished depression and lubricate the portion of the element which engages the lands.

12. A wear surface for engaging a face of an element movable relative thereto in the presence of a lubricating medium; said surface comprising a substantially interrupted surface area and a substantially continuous intervening surface area both presented toward the movable element, the interrupted surface area comprising a multiplicity of triangular surfaces substantially separated from each other by the intervening surface area, one of the surface areas being located closer to the movable element than the other surface area so that one surface area is raised and the other is depressed, each triangular surface being substantially surrounded by the intervening surface area and each further being defined at its edges by a pair of angularly related sidewalls and a base wall, the sidewalls intersecting at an apex and being presented oblique to the direction of relative rotation so that one of the sidewalls functions as a pump impeller and pumps the lubricant generally in a direction transverse to the direction of relative movement, the base wall extending generally in the direction of relative movement, the triangular surfaces being arranged in rows which extend generally in the direction of relative movement and the apexes of one row of triangular surfaces projecting beyond the base walls of the adjacent row of triangular surfaces.

13. A wear surface according to claim 12 wherein the triangular surfaces are further arranged in rows which extend transversely of the direction of relative movement, and wherein the ends of the base walls in each transverse row extend beyond the ends of the base walls in adjacent transverse rows.

14. A wear surface according to claim 12 wherein the apexes of a majority of the triangular surfaces point in one direction; and wherein the apexes of the remaining triangular surfaces point in the opposite direction, whereby the sidewalls extending along the reversely oriented triangular surfaces will distribute the lubricant across the entire face of the removable element which engages the wear surface.

15. A wear surface according to claim 12 and further characterized by a filler material covering the depressed surface area and initially extending outwardly to at least the raised surface area, the filler material being less resistant to wear than the material from which the raised surface area is formed, whereby during relative movement of the element along the wear surface, the filler material covering the depressed surface area will wear, and to a limited extent establish a depression beneath the element.

16. A wear surface according to claim 12 wherein the sidewalls extending along the triangular surfaces merge into the back walls at curved corners.

17. A wear surface according to claim 12 wherein the interrupted surface area is raised and the intervening surface area is depressed, whereby the triangular surfaces form lands and the intervening surface area forms a depression surrounding the lands.

18. A wear surface according to claim 12 disposed on the thrust rib of a bearing having roller elements, the wear surface being engaged by roller elements.

19. A wear surface according to claim 12 disposed on the thrust rib of the cone of a tapered roller bearing and engaged by the large diameter end faces of the tapered rollers.

PO-1050
(5/69)

UNITED STATES PATENT OFFICE
CERTIFICATE OF CORRECTION

Patent No. 3,572,730    Dated March 30, 1971

Inventor(s)   Dennis L. Otto

It is certified that error appears in the above-identified patent and that said Letters Patent are hereby corrected as shown below:

Column 9, line 36, (claim 4); The dependency of claim 4 should be to claim 3, therefore, cancel the number "2" and substitute "3".

Column 9, line 62, (claim 8); The dependency of claim 8 should be to claim 3, therefore, cancel the number "2" and substitute "3".

Signed and sealed this 3rd day of October 1972.

(SEAL)
Attest:

EDWARD M. FLETCHER, JR.
Attesting Officer

ROBERT GOTTSCHALK
Commissioner of Patent